United States Patent [19]
Taylor

[11] Patent Number: 5,113,458
[45] Date of Patent: May 12, 1992

[54] OPTICAL MULTIPLEXING

[75] Inventor: Robert M. Taylor, Cheltenham, England

[73] Assignee: Smiths Industries Public Limited Company, London, England

[21] Appl. No.: 674,909

[22] Filed: Apr. 11, 1991

[30] Foreign Application Priority Data

Apr. 4, 1990 [GB] United Kingdom ............... 9007615

[51] Int. Cl.$^5$ ............................................. G02B 6/26
[52] U.S. Cl. ........................................ 385/11; 385/13; 359/122; 359/123
[58] Field of Search ............... 350/96.10, 96.15, 96.29; 370/1, 4; 385/11, 13; 359/122, 123

[56] References Cited

U.S. PATENT DOCUMENTS

| | | | |
|---|---|---|---|
| 3,991,318 | 11/1976 | Duguay | 350/96.24 |
| 4,367,040 | 1/1983 | Goto | 356/44 |
| 4,749,254 | 6/1988 | Seaver | 350/96.29 |
| 4,818,064 | 4/1989 | Youngquist et al. | 350/96.15 |
| 4,882,716 | 11/1989 | Lefevre et al. | 367/149 |

FOREIGN PATENT DOCUMENTS

| | | |
|---|---|---|
| 0251632 | 1/1988 | European Pat. Off. . |
| 2165118 | 4/1986 | United Kingdom . |
| 2184910 | 7/1987 | United Kingdom . |
| 2236849 | 4/1991 | United Kingdom . |

OTHER PUBLICATIONS

J. Phys E: Sci Instrum 20 (1987) p. 960.

Primary Examiner—Frank Gonzalez
Attorney, Agent, or Firm—Pollock, Vande Sande & Priddy

[57] ABSTRACT

An optical multiplexing system has a source of depolarized radiation at one end of a non-birefringent optical fiber that extends to a decoding interferometer. Sensors in series along the fiber induce birefringence so that the radiation is superimposed onto two polarization modes producing two output wave trains from each sensor with different time separations. The interferometer measures the time separations of the wave trains to identify the sensor and its output.

11 Claims, 2 Drawing Sheets

OPTICAL MULTIPLEXING

BACKGROUND OF THE INVENTION

This invention relates to optical multiplexing systems.

There are various techniques of multiplexing a number of optical devices (such as sensors) some of which are described in patent GB 2184910B. One technique which has recently been proposed is called coherence multiplexing and may take several different forms. In one form, radiation consisting of partially coherent wave trains is supplied to a first channel, such as an optical fiber. The first channel is coupled at points along its length to a second channel, such as a second optical fiber, so that a portion of the radiation in the first channel is coupled to the second channel at each point. At the second point and succeeding points, a part of the radiation on the second channel will be coupled back into the first channel. The path length between adjacent points is arranged to be different for the two channels so that the primary wave train, that is, the original wave train in the first channel, reaches the demultiplexing device at the end of the channel at a different time from the secondary wave trains produced by coupling between the channels. Each coupling point will cause additional secondary wave trains to be produced in both channels. An optical sensor, or similar device, is connected in one or the other of the channels, between the coupling points, so that a change in the variable being sensed causes a change in the wave trains in that channel. This arrangement produces a series array of Mach Zehnder interferometers. The demultiplexer is connected at the end of the second channel and takes the form of an interferometer which may operate either by comparing the primary pulse sequentially with each of the secondary pulses, or by comparing adjacent secondary pulses. This system, however, suffers from a high power budget loss and crosstalk.

An alternative arrangement for producing coherence multiplexing involves the use of a highly birefringent fiber in which the two interferometer arms of the Mach Zehnder arrangement discussed above are replaced by the two linear polarization modes of the fiber. Stressing the fiber at a point causes coupling between the two different modes. An interferometer can be used to identify the location of different points of stress along the fiber. This arrangement can have a lower power loss than the previous arrangement but still suffers from a relatively high crosstalk.

BRIEF SUMMARY OF THE INVENTION

It is an object of the present invention to provide an improved optical multiplexing system.

According to one aspect of the present invention there is provided a optical multiplexing system including a length of a substantially non-birefringent optical fiber and a source of partially coherent depolarized optical radiation at one end of the fiber, the system including a plurality of means for inducing birefringence in the fiber at respective points along its length such that the radiation is superimposed onto two polarization modes which results in each incoming wave train producing two output wave trains separated in time from one another, each means being separated from others of the means by a non-birefringent portion of the fiber, the time separation between output wave trains from each means differing from one another, and the system including means for measuring the time separation between output wave trains.

The means for measuring the time separation between output wave trains is preferably a decoding interferometer.

At least one of the means for inducing birefringence in the fiber may be a sensor such as an accelerometer. At least one of the means for inducing birefringence may be a switch or include a length of fiber wound into a coil. At least one of the means for inducing birefringence may include a length of fiber twisted about its axis or a length of fiber subject to lateral pressure. The length of fiber subject to lateral pressure may be laid in a V-shape groove and subjected to lateral pressure from a pad. A plurality of means for inducing birefringence may be arranged in series along the optical fiber. The system may include means for depolarizing radiation between two of the means for inducing birefringence. Alternatively, a plurality of means for inducing birefringence may be arranged in parallel with one another. The source of radiation may include a luminescent diode and a depolarizer between the diode and the one end of the fiber.

An optical multiplexing system in accordance with the present invention will now be described, by way of example, with reference to the accompanying drawings.

DESCRIPTION OF THE PREFERRED EMBODIMENTS

Figure 1:
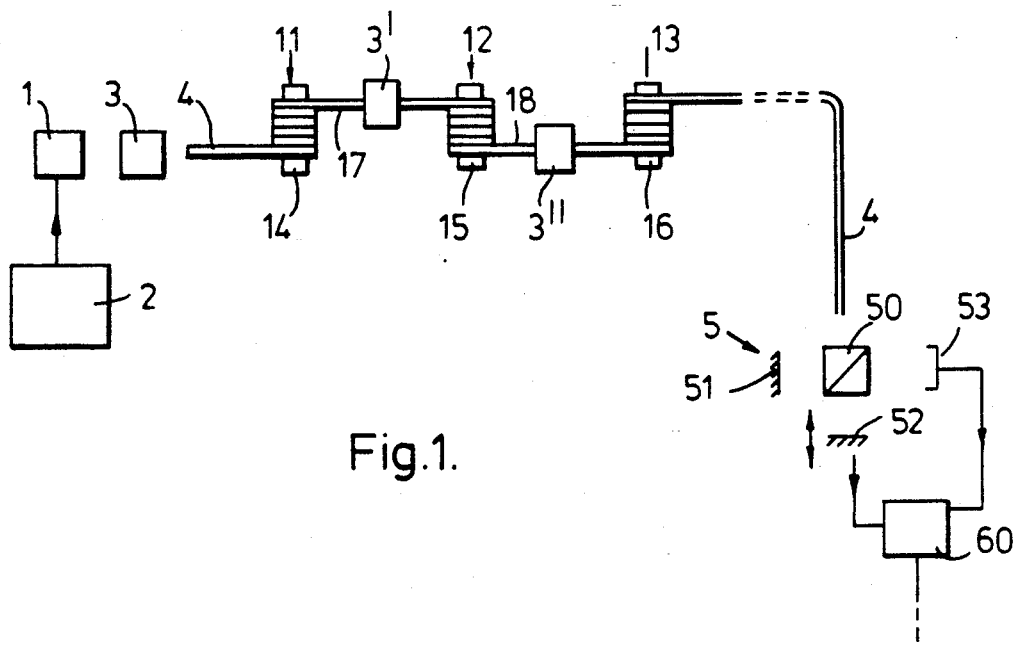
FIG. 1 shows the system schematically.

The system includes a source 1 of optical radiation, such as a super luminescent diode, which has a low coherent length and which is controlled by a drive unit 2 and produces partially coherent optical radiation. The radiation is supplied to a Lyot depolarizer 3 or a similar device for ensuring that the radiation is depolarized, that is, each polarization mode is equally populated.

The depolarized radiation is supplied to one end of a conventional, non-birefringent optical fiber 4. The other end of the fiber extends to a demultiplexer in the form of a decoding interferometer 5 of conventional construction.

Between the source 1 and the interferometer 5 are three optical sensors 11 to 13 which may be optical accelerometers of the kind described in UK Patent Application GB 2236849A. The sensors 11 to 13 illustrated are formed by winding the fiber 4 onto respective compliant mandrels 14 to 16. This causes a degree of birefringence to be induced into the fiber which is dependent on both the bend radius and the tension under which the fiber is coiled, with the polarization axes being defined relative to the axis of the mandrel. Acceleration causes deformation of the mandrels 14 to 16 and hence a change in the tension of the fiber and in the diameter of the mandrel which alters the birefringence. In this way, a partially coherent wave train entering the sensor 11 at one end is superimposed onto two polarization modes which are transmitted through the coil in different times so that a time delay $T_1$ is introduced between the two modes. At the downstream end of the coil, the radiation enters a section 17 of non-birefringent fiber 4 where the two modes are again degenerate and appear as two wave trains pulses separated by the time $T_1$. The wave trains may be depolarized using a further Lyot depolarizer 3'.

Figure 2:
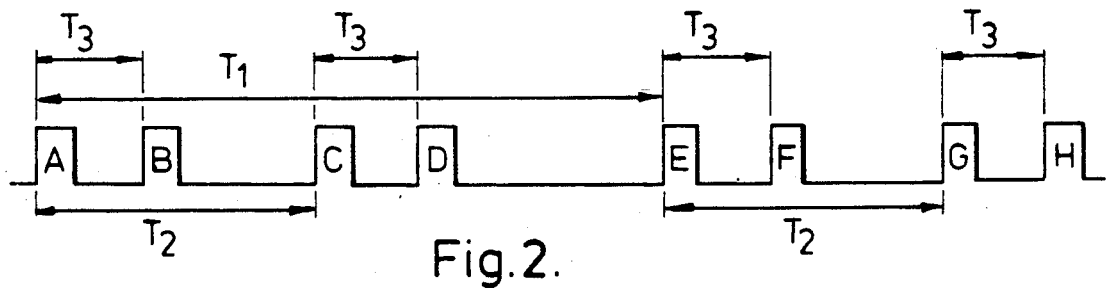
FIG. 2 shows the output of the system.

At the next sensor 12, the process is repeated and a time delay $T_2$ is introduced between the two modes for both of the input pulses. This results in four output pulses being produced on a downstream section 18 of the fiber between the two sensors 12 and 13. The third sensor 13 introduces a delay $T_3$ between the two polarization modes so that the resulting output to the interferometer 5 takes the form of eight wave trains A to H which are represented as pulses, for simplicity, in FIG. 2.

The amount of each delay $T_1$, $T_2$ and $T_3$ varies according to the acceleration experienced by each sensor 11 to 13 and each sensor is arranged so that, for the range of its time delay $T_1$, $T_2$ or $T_3$, the wave trains it produces will not overlap with those produced by the other two sensors.

The interferometer 5 may take any conventional form. An illustrated, it includes a beam splitter 50 that directs a part of the incoming radiation to a fixed mirror 51 and a part to a moving mirror 52 that is scanned up and down. Radiation reflected from the two mirrors 51 and 52 passes to a detector 53. Interference will be produced at the detector 53 between the radiation from the two mirrors when the path length between the two arms of the interferometer is equal or when the path lengths differ by amounts corresponding to the time delay between different ones of the wave trains, so that radiation in one wave trains interferes with radiation in the other wave train. For example, if the mirror 52 moves outwardly from an initial position in which the two arms of the interferometer are equal, the first wave trains to interfere with one another will be the wave trains A and B, C and D, E and F, and G and H, where there is the smallest time difference between them, namely $T_3$. As the mirror 52 moves further out, wave trains B and C, D and E, and F and G will interfere which correspond to a time difference of $T_2-T_3$. Interference will subsequently take place between wave trains A and C, C and E, and E and G and also between B and D, C and E, and F and H which both correspond to time differences of $T_2$. Further movement of the mirror will cause interference between different pairs of wave trains. The position of the movable mirror 52 at which interference is produced is measured by a unit 60 so that different ones of the sensors 11 to 13 are identified together with their time delays, and hence the acceleration, experienced at each sensor.

Figure 3:
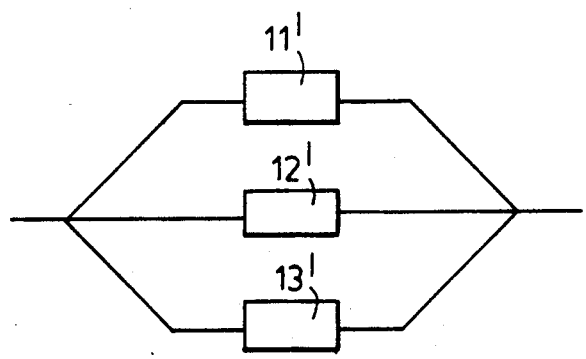
FIG. 3 shows an alternative arrangement of the system.

It will be appreciated that a different number of optical devices could be used and that these need not be arranged in series but could, for example, be arranged in parallel, as shown at 11', 12' and 13' in FIG. 3.

Figure 4:
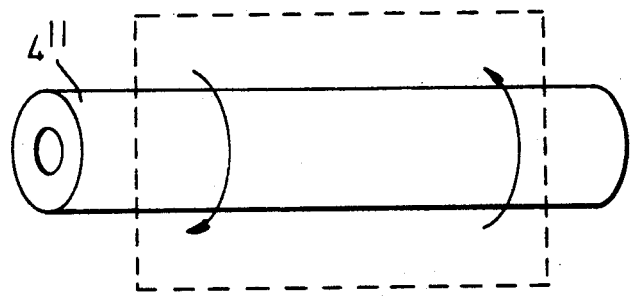
FIGS. 4 and 5 show alternative sensors of the system.
Figure 5:
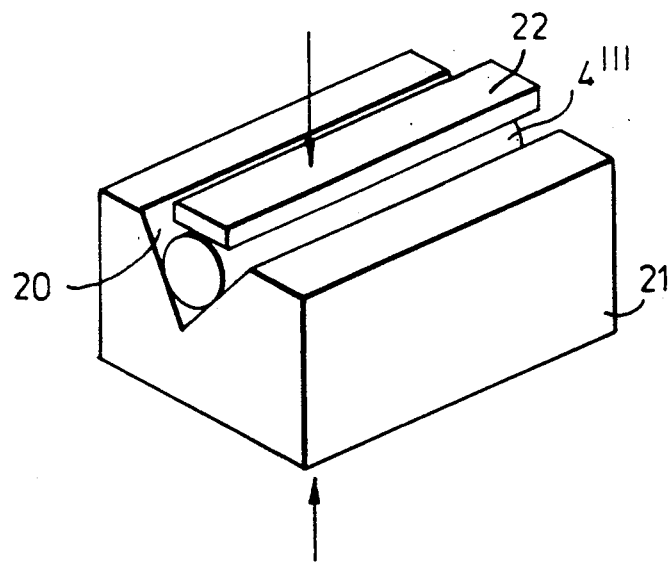

The optical devices need not be accelerometers or other sensors but could be, for example, switches or combinations of different sensors and switches. Birefringence can be induced by the optical devices in ways other than by forming the fiber into a coil. For example, the fiber 4" could be twisted about its axis, as shown in FIG. 4. Alternatively, the fiber 4''' could be laid in a V-shape groove 20 in a block 21 and subjected to lateral pressure from a pad 22, as shown in FIG. 5.

What I claim is:

1. An optical multiplexing system comprising: a length of a substantially non-birefringent optical fiber; a source of partially coherent depolarized optical radiation at one end of the fiber; a plurality of devices for inducing birefringence in the fiber at respective points along its length separated by non-birefringent portions of the fiber, such that the radiation is superimposed onto two polarization modes which results in each incoming wave train producing two output wave trains separated in time from one another, the time separation between output wave trains from each device differing from one another; and means for measuring the time separation between output wave trains and providing an output in accordance therewith.

2. An optical multiplexing system according to claim 1, wherein the means for measuring the time separation between output wave trains is a decoding interferometer.

3. An optical multiplexing system according to claim 1, wherein at least one of the devices for inducing birefringence in the fiber is a sensor.

4. An optical multiplexing system according to claim 3, wherein the sensor is an accelerometer.

5. An optical multiplexing system according to claim 1, wherein at least one of the devices for inducing birefringence includes a length of fiber wound into a coil.

6. An optical multiplexing system according to claim 1, wherein at least one of the devices for inducing birefringence is a switch.

7. An optical multiplexing system according to claim 1, wherein at least one of the devices for inducing birefringence includes a length of fiber and means for twisting the fiber about its axis.

8. An optical multiplexing system according to claim 1, wherein at least one of the devices for inducing birefringence includes a length of fiber and means for subjecting the length of fiber to lateral pressure.

9. An optical multiplexing system according to claim 1, wherein a plurality of devices for inducing birefringence are arranged in series along the optical fiber.

10. An optical multiplexing system according to claim 9, wherein the system includes a depolarizer between two of the devices for inducing birefringence.

11. An optical multiplexing system according to claim 1, wherein said plurality of the devices for inducing birefringence are arranged in parallel with one another.

* * * * *